(12) United States Patent
Gnech et al.

(10) Patent No.: US 9,940,311 B2
(45) Date of Patent: Apr. 10, 2018

(54) OPTIMIZED READ/WRITE ACCESS TO A DOCUMENT OBJECT MODEL

(71) Applicant: International Business Machines Corporation, Armonk, NY (US)

(72) Inventors: Thomas H. Gnech, Herrenberg (DE); Steffen Koenig, Heidelberg (DE); Oliver Petrik, Stuttgart (DE); Jochen Roehrig, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 14/195,485

(22) Filed: Mar. 3, 2014

(65) Prior Publication Data

US 2015/0248383 A1 Sep. 3, 2015

(51) Int. Cl.
*G06F 3/00* (2006.01)
*G06F 17/22* (2006.01)
*G06F 17/30* (2006.01)

(52) U.S. Cl.
CPC ...... *G06F 17/2264* (2013.01); *G06F 17/2247* (2013.01); *G06F 17/30575* (2013.01); *G06F 17/30896* (2013.01); *G06F 17/30905* (2013.01); *G06F 17/30914* (2013.01)

(58) Field of Classification Search
CPC ............ G06F 17/2246; G06F 17/2247; G06F 17/30575; G06F 17/30896; G06F 17/30905; G06F 17/30914; G06F 17/2264
See application file for complete search history.

(56) References Cited

U.S. PATENT DOCUMENTS

| 6,256,783 | B1* | 7/2001 | Wada ................ G06F 17/30569 707/E17.006 |
| 7,490,023 | B2* | 2/2009 | Aniszozyk .......... G06F 11/3447 702/182 |
| 8,214,439 | B2 | 7/2012 | Williams et al. |
| 8,667,390 | B2 | 3/2014 | Goldman |
| 9,081,956 | B2 | 7/2015 | Klein et al. |
| 2002/0038319 | A1 | 3/2002 | Yahagi |
| 2003/0154216 | A1* | 8/2003 | Arnold .............. G06F 17/30292 |

(Continued)

OTHER PUBLICATIONS

Le Hegaret et al., "What is the Document Object Model?", Nov. 13, 2000, <http://www.w3.org/TR/DOM-Level-2-Core/introduction.html>, pp. 1-7.*

(Continued)

*Primary Examiner* — Kyle Stork
(74) *Attorney, Agent, or Firm* — Maeve Carpenter

(57) ABSTRACT

In an approach for optimizing read/write access to a document object model in a web browser, one or more computer processors detect one or more accesses to a first data structure of a document object model. Based on the detected one or more accesses, the one or more computer processors determine whether the first data structure is a highly dynamic part of the document object model. Responsive to determining the first data structure is a highly dynamic part of the document object model, the one or more computer processors trigger a conversion of the first data structure to an access optimized data structure. The one or more computer processors convert the first data structure to an access optimized data structure.

11 Claims, 6 Drawing Sheets

(56) References Cited

U.S. PATENT DOCUMENTS

| | | | |
|---|---|---|---|
| 2005/0044145 A1* | 2/2005 | Quinn | H04L 29/06 709/205 |
| 2006/0294549 A1* | 12/2006 | Schindler | H04W 48/12 725/48 |
| 2008/0215532 A1 | 9/2008 | Arnold et al. | |
| 2009/0177642 A1* | 7/2009 | Chung | G06F 11/3419 |
| 2010/0031167 A1 | 2/2010 | Roytman | |
| 2010/0306222 A1 | 12/2010 | Freedman et al. | |
| 2011/0296391 A1* | 12/2011 | Gass | G06F 8/72 717/168 |
| 2013/0086127 A1 | 4/2013 | Pogmore | |
| 2013/0212465 A1* | 8/2013 | Kovatch | G06F 17/227 715/234 |
| 2014/0165035 A1* | 6/2014 | Campbell | G06F 8/72 717/121 |
| 2014/0281918 A1* | 9/2014 | Wei | H04L 67/02 715/234 |
| 2015/0074177 A1* | 3/2015 | Yamamoto | G06F 11/3419 709/203 |

OTHER PUBLICATIONS

U.S. Appl. No. 14/301,467.
U.S. Appl. No. 14/301,467, filed Jun. 11, 2014.

* cited by examiner

OPTIMIZED READ/WRITE ACCESS TO A DOCUMENT OBJECT MODEL

FIELD OF THE INVENTION

The present invention relates generally to the field of web browsers, and more particularly to optimizing web browser performance.

BACKGROUND

The Internet provides for the collective resources available within large networks to be shared among users. The growth of the Internet has allowed sharing of computer resources to be brought to wide audiences. For many companies, Internet sites are an integral part of the business, offering customers detailed information on available products, providing customers with a direct means of making purchases, and serving as a conduit between technical support operations and customers in need of service.

Digital information displayed on the Internet may be found on web pages viewed through a web browser. A web page is a HyperText Markup Language (HTML) file containing both text and a set of HTML tags that describe how the text should be formatted when the web browser displays the web page on a user's display screen. A web browser is a computer program capable of accessing a web server on the Internet, requests the web page, and retrieves the page so that a user can view HTML documents and access files and programs related to those HTML documents. A web server is a program that uses Hypertext Transfer Protocol (HTTP), or related protocols, to provide HTML documents and files and programs related to those documents when requested by a web browser. The web browser then interprets the HTML tags within the page and displays the page.

JavaScript® is an interpreted computer programming language. The most common use of JavaScript® is to write functions that are embedded in or included within HTML pages and interact with the Document Object Model (DOM) of the page. The DOM is a standard developed at the World Wide Web consortium for a platform- and language-independent interface to the structure and content of HTML and Extensible Markup Language (XML) documents. JavaScript® provides the tools to manipulate the objects in a Web page. The DOM is the specification for how all those objects are represented. The DOM allows JavaScript® to programmatically access and manipulate the contents of a document. The DOM defines: each object on a Web page, attributes associated with those objects, and methods that can be used to manipulate those objects. By using the DOM, JavaScript® can dynamically update the content, structure, and style of Web pages.

SUMMARY

Embodiments of the present invention disclose a method, computer program product, and system for optimizing read/write access to a document object model in a web browser. The method includes one or more computer processors detecting one or more accesses to a first data structure of a document object model. Based on the detected one or more accesses, the one or more computer processors determine whether the first data structure is a highly dynamic part of the document object model. Responsive to determining the first data structure is a highly dynamic part of the document object model, the one or more computer processors trigger a conversion of the first data structure to an access optimized data structure. The one or more computer processors convert the first data structure to an access optimized data structure.

DETAILED DESCRIPTION

A web browser generally includes four high-level components: a Document Object Model (DOM) manager, a script engine, a render engine, and optional external components, for example, browser plug-ins. The structure of an HTML document retrieved from a web server by the web browser is stored in the DOM that is managed by the DOM manager component. The script engine, such as JavaScript®, reads and modifies the DOM according to the results of code executed within the engine. The render engine reads the DOM and uses retrieved information for creating the corresponding visual output in the web browser. The optional external components may modify the DOM, or parts of the DOM, and read the DOM or parts of the DOM.

Certain read and write operations to a DOM as performed by web browser script engines lead to highly dynamic parts (HDP) in a DOM. Highly dynamic parts of a DOM are defined as data structures that create a bottleneck in the web browser performance due to excess processing time. The excess processing time may be due to the HDP being accessed very often, or it may be due to an inefficiency of a data structure that uses significant processing demand each time it is accessed. Handling of highly dynamic parts is costly and decreases script execution performance.

Embodiments of the present invention recognize that efficiencies can be gained by optimizing accesses to a web browser's DOM by converting HDPs into access optimized data structures (AOD). Implementation of embodiments of the invention may take a variety of forms, and exemplary implementation details are discussed subsequently with reference to the Figures.

Figure 1:
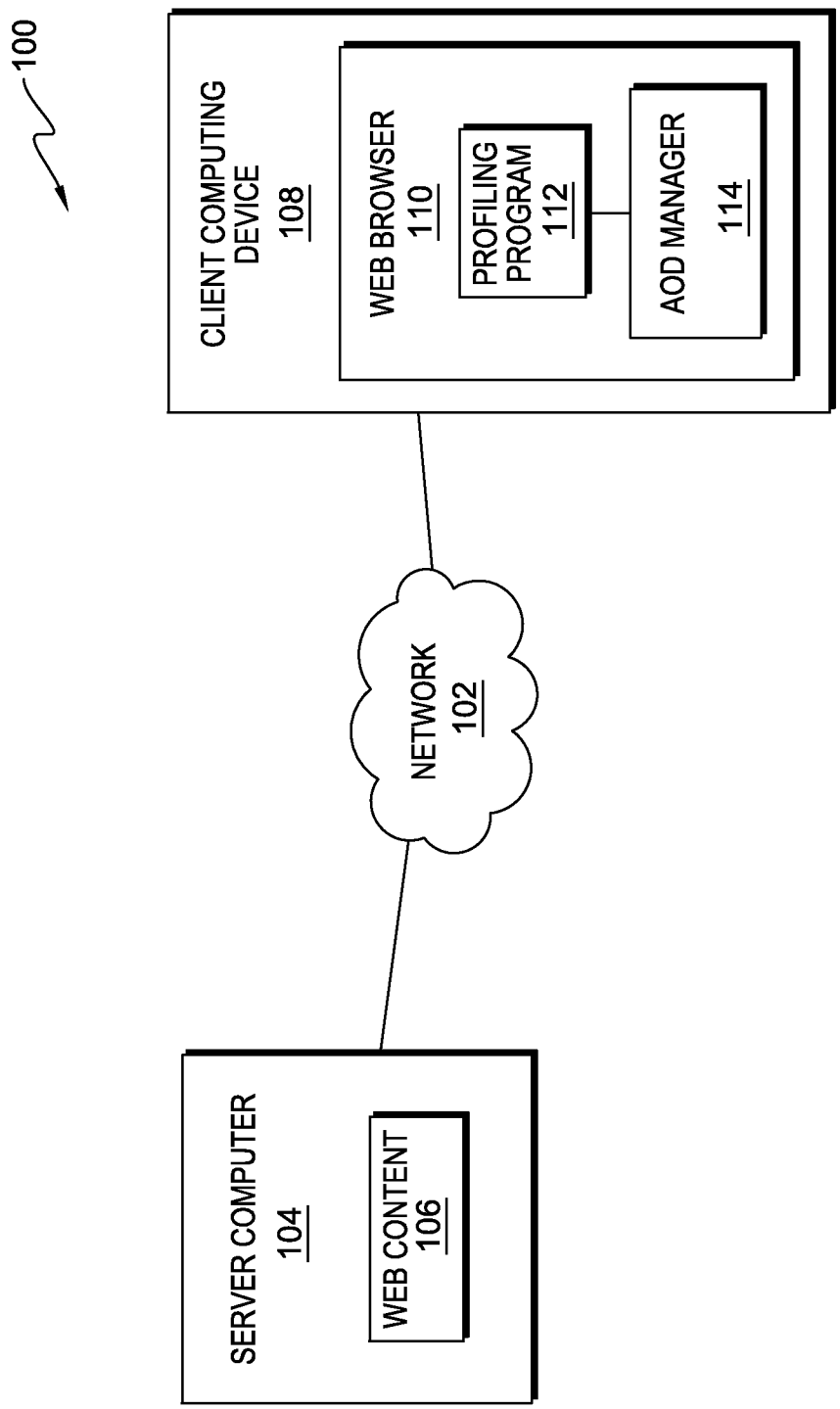
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 108, interconnected over network 102. Network 102 can be, for example, a local area network (LAN), a wide area network (WAN), such as the Internet, or a combination of the two, and can include wired, wireless, or fiber optic connections. In general, network 102 can be any combination of connections and protocols that will support communications between server computer 104 and client computing device 108.

Server computer 104 may be a management server, a web server, or any other programmable electronic device or computing system capable of receiving and sending data. In other embodiments, server computer 104 may represent a server computing system utilizing multiple computers as a server system, such as in a cloud computing environment. In another embodiment, server computer 104 may be a laptop computer, a tablet computer, a netbook computer, a personal computer (PC), a desktop computer, a personal digital assistant (PDA), a smart phone, or any programmable electronic device capable of communicating with client computing device 108 via network 102. In another embodiment, server computer 104 represents a computing system utilizing clustered computers and components to act as a single pool of seamless resources. Server computer 104 includes web content 106.

Web content 106 may be any data or application hosted by a web server for access by a web browser, such as web browser 110 on client computing device 108 within distributed data processing environment 100. Web content 106 is the textual, visual or aural content that is encountered as part of the user experience on websites. Web content 106 may include text, images, sounds, videos and animations. Web content 106 may be a web page, a database, a computer program, such as a game, or any other computer software/application a user may access from web browser 110 via network 102.

Client computing device 108 may be a desktop computer, a laptop computer, a tablet computer, a specialized computer server, a smart phone, or any programmable electronic device capable of communicating with server computer 104 via network 102 and with various components and devices within distributed data processing environment 100. In general, client computing device 108 represents any programmable electronic device or combination of programmable electronic devices capable of executing machine readable program instructions and communicating with other computing devices via a network, such as network 102. Client computing device 108 includes web browser 110. Client computing device 108 may include internal and external hardware components, as depicted and described in further detail with respect to FIG. 6.

Web browser 110 resides on client computing device 108. A web browser is a software application for retrieving, presenting, and traversing information resources on the World Wide Web. Although web browsers are primarily intended to use the World Wide Web, they can also be used to access information provided by web servers in private networks, including intranets, or files in file systems. Web browser 110 includes profiling program 112 and access optimized data structure (AOD) manager 114. In an exemplary embodiment, web browser 110 accesses web content 106 via network 102.

Profiling program 112 determines the highly dynamic parts within a hierarchical DOM structure. Profiling program 112 constantly monitors read and write access to a DOM by web browser components, for example a JavaScript® engine and a render engine. Profiling program 112 collects statistics about accesses to the DOM. The statistics include such information as the type of access (read or write), the number of accesses, access paths, and access costs. Profiling program 112 includes an optimization policy. An optimization policy defines the rules which determine whether a data structure is considered a highly dynamic part (HDP), including requirements such as thresholds. If accesses to a particular data structure exceed the optimization policy threshold, the particular data structure is considered an HDP. For example, the optimization policy may define any data structure that is accessed through a particular sub-tree more than 100 times per second as an HDP. In another example, the optimization policy may determine that a data structure in which read access to a particular sub-tree takes longer than 10 milliseconds is an HDP. Profiling program 112 determines whether a data structure within a DOM is an HDP by applying the optimization policy to the collected statistics. Profiling program 112 is depicted and described in further detail with respect to FIG. 2.

AOD manager 114 acts as an interface between profiling program 112 and the DOM, and manages the optimization process. AOD manager 114 is triggered when profiling program 112 detects an HDP. Once an HDP is detected, AOD manager 114 converts the hierarchical data structure in the DOM to an access optimized data structure (AOD) and may replace the HDP structure in the DOM. An AOD is a data structure that is optimized for the access type, i.e. read or write, and therefore consumes less processing demand. AOD manager 114 is depicted and described in further detail with respect to FIG. 3.

Figure 2:
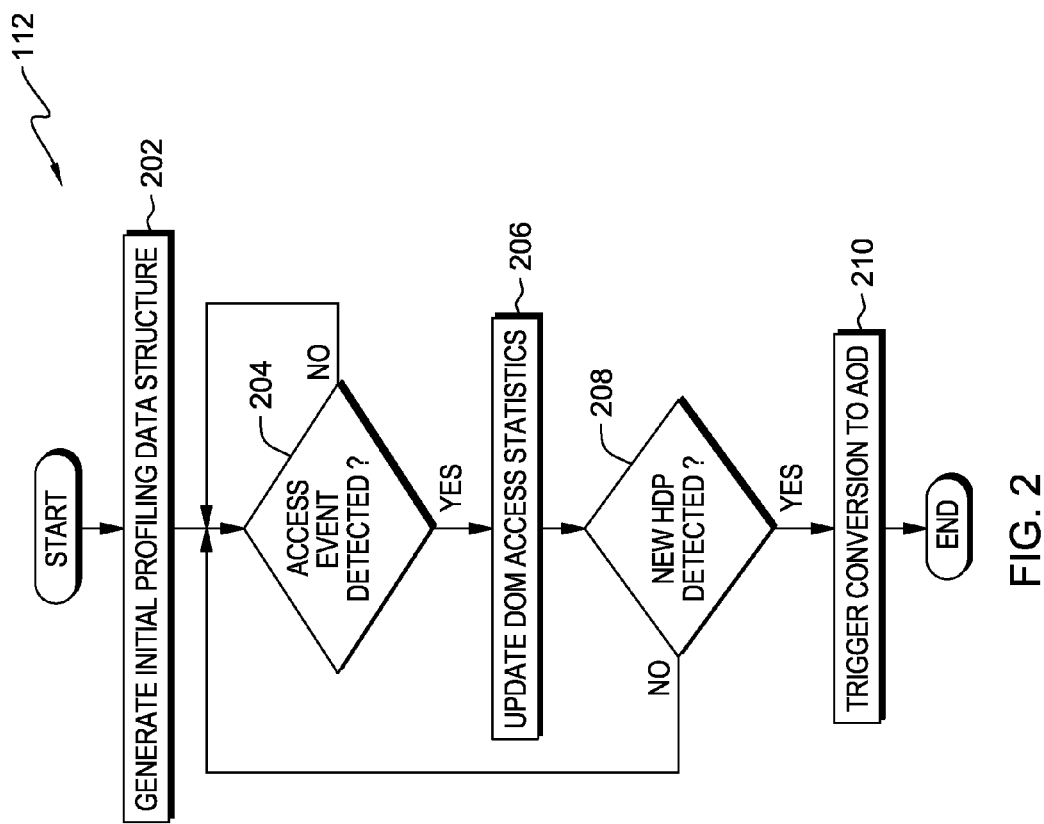
FIG. 2 is a flowchart depicting operational steps of a profiling program, on a client computing device within the data processing environment of FIG. 1, for collecting statistics with regard to DOM access, in accordance with an embodiment of the present invention.

FIG. 2 is a flowchart depicting operational steps of profiling program 112, on client computing device 108 within data processing environment 100 of FIG. 1, for collecting statistics with regard to DOM access, in accordance with an embodiment of the present invention.

Profiling program 112 generates an initial profiling data structure (step 202). The profiling data structure is used to store the DOM access statistics collected during the profiling process. Examples of DOM access statistics collected include quantity of accesses, type of access, access paths, access costs, as well as other statistics related to the optimization policy.

Profiling program 112 determines whether an access event is detected (decision block 204). An access event is a point in time when the DOM is accessed. Profiling program 112 constantly monitors read and write accesses to the DOM by, for example, the JavaScript® engine and the render engine. If no access event is detected (no branch, decision block 204), profiling program 112 continues to monitor the DOM for an access event. If an access event is detected (yes branch, decision block 204), profiling program 112 updates the DOM access statistics (step 206). Profiling program 112 continually monitors access to the DOM and updates the initial profiling data structure with the DOM access statistics for each access.

Subsequent to updating the DOM access statistics, profiling program 112 determines whether a new HDP is detected (decision block 208). A new HDP is detected by analyzing the DOM access statistics with reference to an optimization policy. The optimization policy provides the criteria for determining whether a data structure in the DOM may be optimized, and therefore improve the efficiency of web browser 110. For example, the optimization policy may define that if a particular data structure in the DOM is accessed more than 100 times per second, that data structure is a highly dynamic part and requires optimization. If a new HDP is not detected (no branch, decision block 208), profiling program 112 continues to monitor for access events. In one embodiment, the optimization policy is delivered by the web browser vendor. In another embodiment, the optimization policy may be specific to a particular type of web page. For example, an online game provider may provide an optimization policy to ensure the user has the best experience with the provider's game. If a new HDP is detected (yes branch, decision block 208), profiling program 112 triggers the conversion of the HDP to an access optimized data structure (step 210). The triggering activity is a communication from profiling program 112 to AOD manager 114. Once an HDP is identified, profiling program 112 triggers AOD manager 114 to convert the HDP to an AOD.

Figure 3:
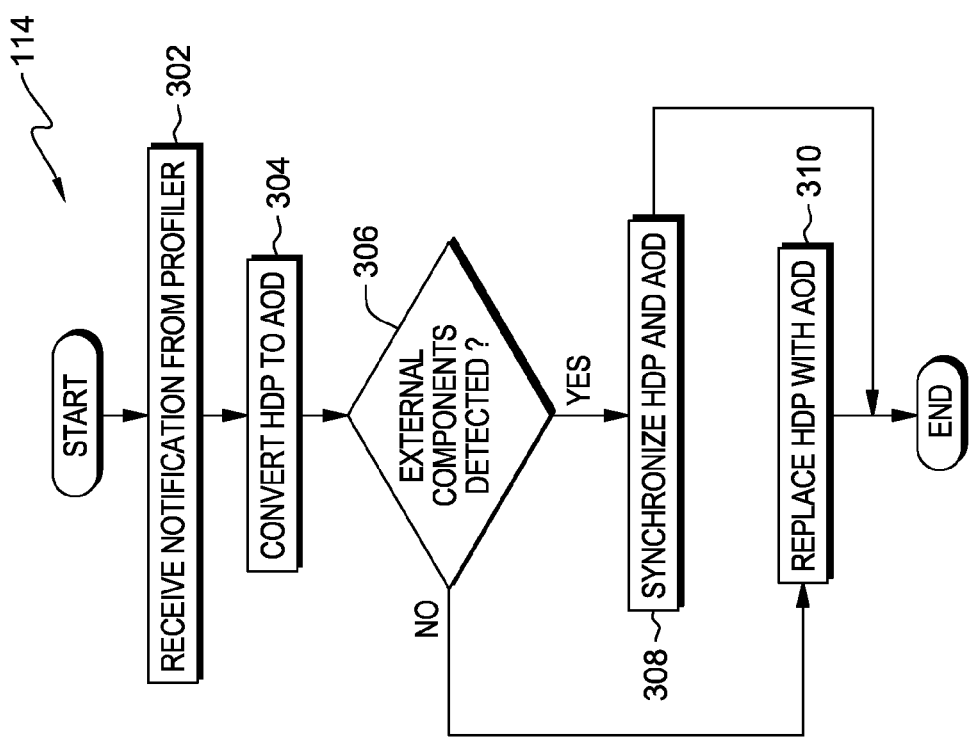
FIG. 3 is a flowchart depicting operational steps of an access optimized data structure manager, on a client computing device within the data processing environment of FIG. 1, for converting and synchronizing highly dynamic parts of a DOM, in accordance with an embodiment of the present invention.

FIG. 3 is a flowchart depicting operational steps of access optimized data structure (AOD) manager 114 on client computing device 108 within data processing environment 100 of FIG. 1, for converting and synchronizing highly dynamic parts of a DOM, in accordance with an embodiment of the present invention.

AOD manager 114 receives notification from profiling program 112 that an HDP has been detected (step 302). Profiling program 112 triggers AOD manager 114 to begin the optimization process. Subsequent to receiving notification, AOD manager 114 converts the HDP into an AOD (step 304). AOD manager 114 transforms the original data structure, or sub-tree, of the DOM that is the HDP into an access optimized data structure. The AOD is an optimized data structure for read/write data. The AOD is organized in such a way that all accesses to its components, which correspond to the nodes of the original sub-tree of the detected HDP, can be carried out in a more efficient way than access to the nodes in the original DOM sub-tree. In one embodiment, the AOD may be a hash table. In another embodiment, where the DOM is always updated in a certain sequence, the AOD may be a static list. In yet another embodiment, the AOD may be an address to a particular memory part.

AOD manager 114 determines whether any external components are present in web browser 110 (decision block 306). Using known methods, AOD manager 114 can detect the presence of external components. For example, an available software application may be installed that has a means of adding additional components and plug-ins. Once installed, the additional components and plug-ins may gain access to internal data structures of the host application, including the DOM in a web browser application. If no external components are detected (no branch, decision block 306), AOD manager 114 replaces the HDP with the new AOD in the DOM (step 310). Once the AOD has replaced the HDP in the DOM, all subsequent accesses to the former HDP part of the DOM are now carried out on the AOD.

If external components are detected (yes branch, decision block 306), AOD manager 114 synchronizes the HDP and the AOD (step 308). A browser plug-in is an example of an external component that may be included in a web browser, such as web browser 110. External components may access the DOM but can be unaware of the AOD implementation in the web browser. If external components are present that are not aware of an AOD data structure, AOD manager 114 can not replace the HDP. Instead, the AOD coexists with the traditional DOM sub-tree structure of the HDP such that accesses to the DOM from the AOD-unaware external components are carried out on the corresponding DOM sub-tree. Because the AOD and HDP coexist, they must be synchronized such that an update to one is also an update to the other. In a preferred embodiment, AOD manager 114 synchronizes the AOD and HDP each time the DOM is updated. In another embodiment, AOD manager 114 synchronizes the AOD and HDP periodically. For example, the synchronization can be scheduled to occur after a certain period of time. In another example, the synchronization can be scheduled to occur after a certain count of accesses to the web page.

Figure 4:
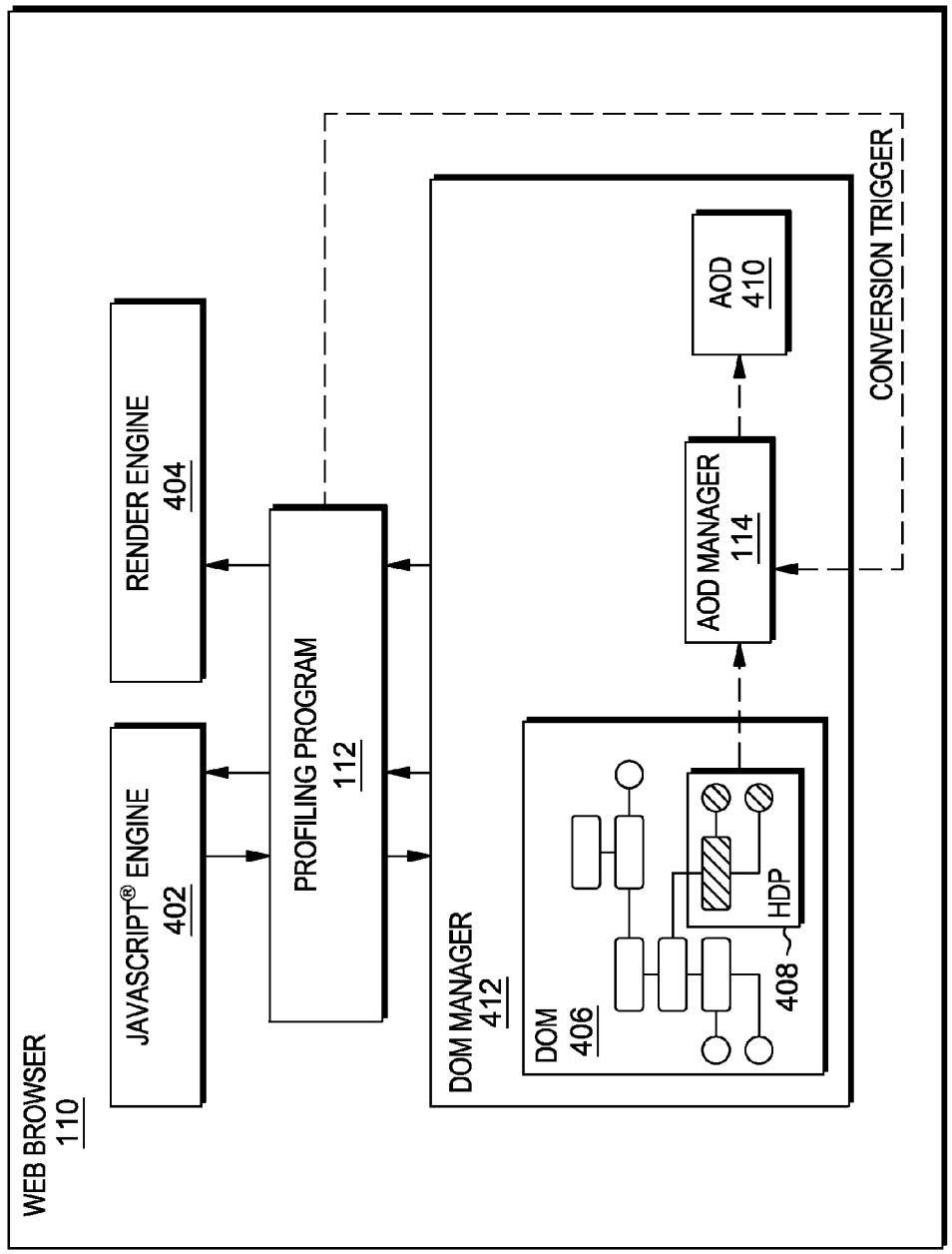
FIG. 4 is a flow diagram illustrating a web browser incorporating a profiling program and an access optimized data structure manager, in accordance with an embodiment of the present invention.

FIG. 4 is a flow diagram illustrating web browser 110 incorporating profiling program 112 and access optimized data structure manager 114, in accordance with an embodiment of the present invention. Web browser 110 includes JavaScript® engine 402 and render engine 404. A JavaScript® engine is specialized computer software which interprets and executes JavaScript®. A render engine is a software component that takes marked-up content (such as HTML, XML, image files, etc.) and formatting information, and displays the formatted content on a display screen of a computing device operating the web browser. Web browser 110 also includes DOM 406 within DOM manager 412. DOM manager 412 is the function that operates on the DOM data structure. Profiling program 112 is positioned to detect each access by JavaScript® engine 402 and render engine 404 of DOM 406. Profiling program 112 detects each access event and stores the DOM access statistics.

DOM 406 is represented with a tree-like, hierarchical structure with an XML-based format. An exemplary sub-tree of the structure is depicted as HDP 408. HDP 408 represents a highly dynamic part of DOM 406 that has been determined by profiling program 112 applying an optimization policy to the DOM access statistics. The dashed line between profiling program 112 and AOD manager 114 indicates profiling program 112 triggering AOD manager 114 to convert HDP 408 to an access optimized data structure. The conversion is shown by the creation of AOD 410. In the depicted embodiment, AOD 410 replaces HDP 408 in the DOM structure, such that all subsequent accesses to HDP 408 of DOM 406 are carried out on AOD 410.

Figure 5:
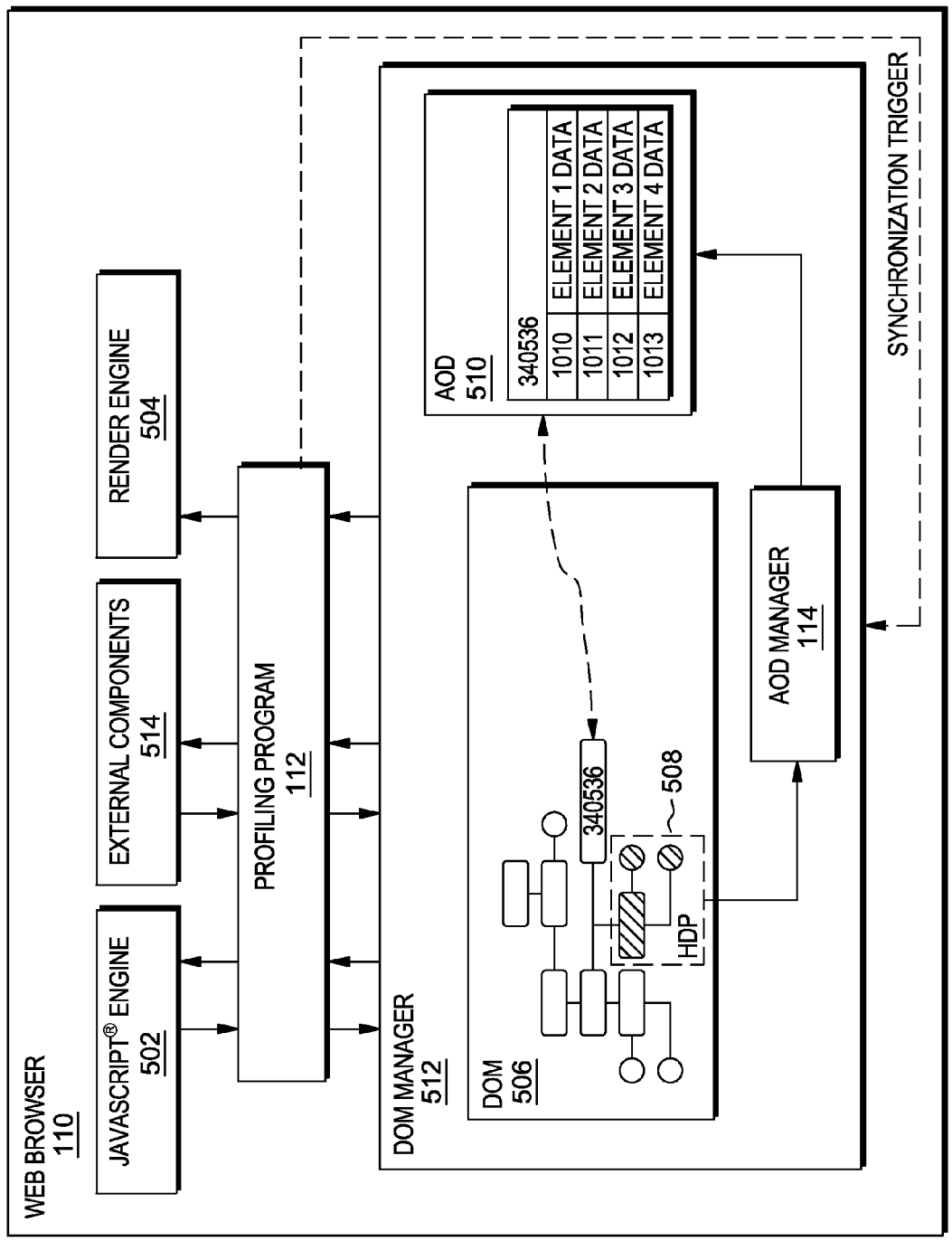
FIG. 5 is a flow diagram illustrating a web browser with external components incorporating a profiling program and an access optimized data structure manager, in accordance with an embodiment of the present invention.

FIG. 5 is a flow diagram illustrating web browser 110 with external components 514 incorporating profiling program 112 and access optimized data structure manager 114, in accordance with an embodiment of the present invention. This embodiment is similar to the embodiment depicted in FIG. 4 with the addition of external components 514. External components 514 interacts with profiling program 112, therefore DOM access statistics can be collected for read and/or write accesses of DOM 506 by external components 514, as well as by JavaScript® engine 502 and render engine 504. DOM 506 is represented with a tree-like, hierarchical structure with an XML-based format. An exemplary sub-tree of the structure is depicted as HDP 508. HDP 508 represents a highly dynamic part of DOM 506 that has been detected by profiling program 112 applying an optimization policy to the DOM access statistics. Profiling program 112 triggers AOD manager 114, and AOD manager 114 converts HDP 508 to an access optimized data structure. An exemplary conversion is shown by the creation of AOD 510. AOD 510 is represented with an identifier depicted as "340536". Because external components 514 may be unaware of the presence of AOD manager 114, HDP 508 remains in DOM 506 for access by external components 514. AOD 510 is kept separately, attached to the HDP root node in DOM 506, instead of being directly attached to the DOM tree to allow rerouting of subsequent access of HDP 508 to AOD 510, and may be referenced by the corresponding identifier, as indicated by the dashed line between identifier 340536 in DOM 506 and AOD 510.

HDP 508 and AOD 510 must be synchronized to prevent data corruption and inconsistencies. If the data in HDP 508 and AOD 510 are not identical, render engine 504 may show unpredictable results. This may happen when an AOD-unaware external component modifies the data shown in web formula input fields, while the render engine uses the AOD data structure to render the formula input fields. Profiling program 112 monitors accesses to HDP 508 and AOD 510. The dashed line between profiling program 112 and AOD manager 114 indicates profiling program 112 triggering AOD manager 114 to synchronize HDP 508 and AOD 510 when either one of those structures is updated. In one embodiment, AOD manager 114 may compare HDP 508 to AOD 510 when triggered to synchronize. In another embodiment, AOD manager 114 may simply copy the most recently updated data structure to the other when triggered to synchronize.

Figure 6:
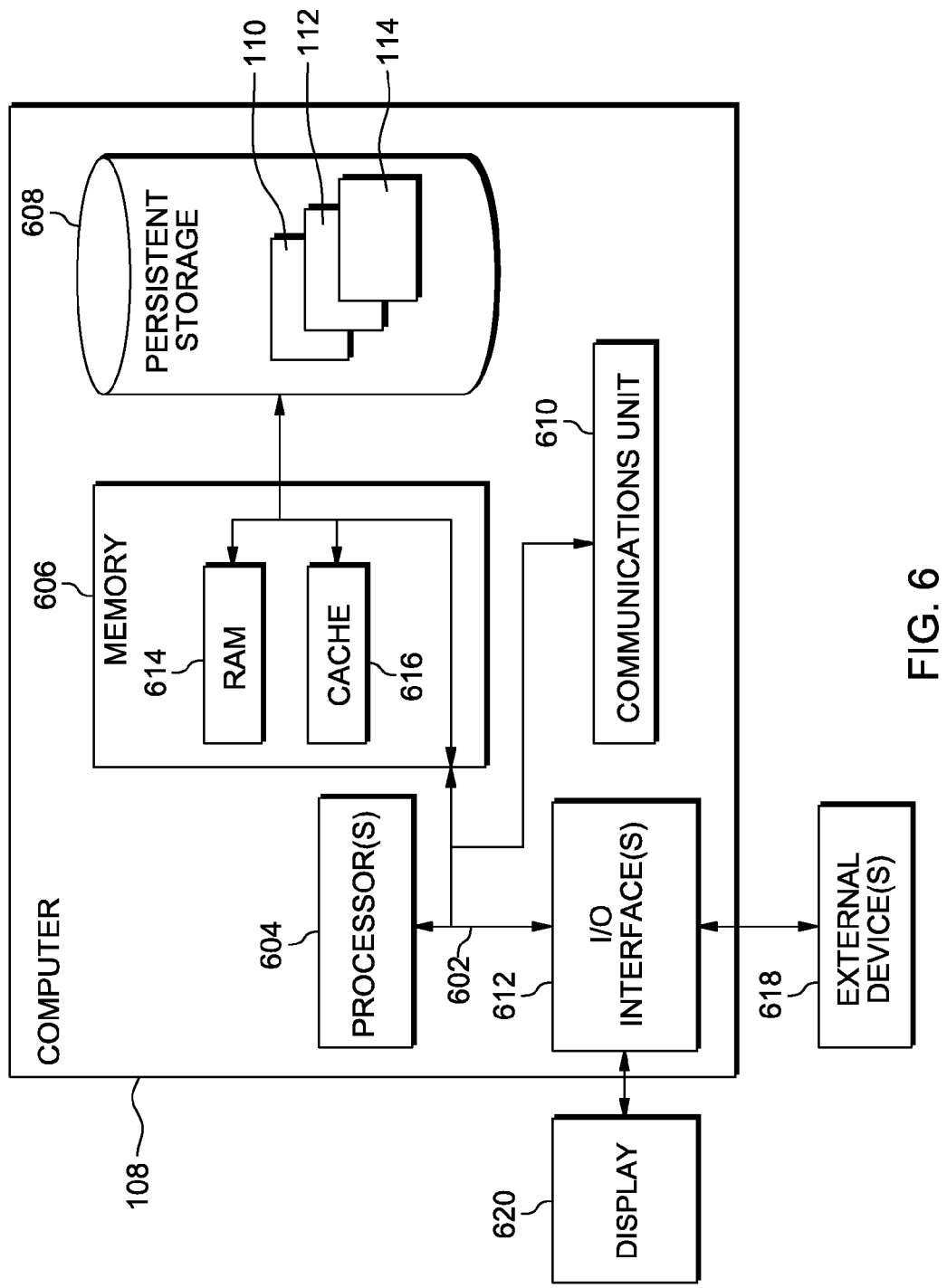
FIG. 6 depicts a block diagram of components of the client computing device executing the profiling program and the access optimized data structure manager, in accordance with an embodiment of the present invention.

FIG. 6 depicts a block diagram of components of client computing device 108 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Client computing device 108 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Web browser 110, profiling program 112, and AOD manager 114 are stored in persistent storage 608 for execution and/or access by one or more of the respective computer processor(s) 604 via one or more memories of memory 606. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of server computer 104. In these examples, communications unit 610 includes one or more network interface cards. Communications unit 610 may provide communications through the use of either or both physical and wireless communications links. Web browser 110, profiling program 112, and AOD manager 114 may be downloaded to persistent storage 608 through communications unit 610.

I/O interface(s) 612 allows for input and output of data with other devices that may be connected to client computing device 108. For example, I/O interface(s) 612 may provide a connection to external devices 618 such as a keyboard, a keypad, a touch screen, and/or some other suitable input device. External device(s) 618 can also include portable computer readable storage media such as, for example, thumb drives, portable optical or magnetic disks, and memory cards. Software and data used to practice embodiments of the present invention, e.g., web browser 110, profiling program 112, and AOD manager 114, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for optimizing read/write access to a document object model in a web browser, the computer program product comprising:
   one or more computer readable storage devices and program instructions stored on the one or more computer readable storage devices, wherein the one or more computer readable storage devices are hardware, the program instructions comprising:
   program instructions to detect a number of read/write accesses to a first data structure of a document object model in a web browser by one or more web browser components, wherein the document object model defines each object on a web page, one or more attributes associated with the objects, and one or more methods that can be used to manipulate the objects, and wherein the one or more web browser components include at least one of a script engine and a render engine;
   program instructions to determine, based on the detected number of read/write accesses to the first data structure of the document object model and on at least a first rule that defines a data structure as a highly dynamic part, whether the first data structure is a highly dynamic part of the document object model, wherein the first rule includes determining whether the number of read/write accesses exceeds a threshold, and wherein a highly dynamic part of a document object model is a data structure that creates a bottleneck in the web browser performance due to excess processing time, wherein excess processing time is due to the highly dynamic part being accessed in excess of the threshold;
   responsive to determining the first data structure is a highly dynamic part of the document object model, program instructions to trigger a conversion of the first data structure to an access optimized data structure;

program instructions to convert the first data structure to an access optimized data structure;

program instructions to detect a presence of one or more external components, wherein the one or more external components are included in the web browser, and wherein the one or more external components are unaware of the access optimized data structure;

program instructions to synchronize, the highly dynamic part and the access optimized data structure, wherein the one or more external components access the highly dynamic part of the document object model; and program instructions to reroute one or more subsequent accesses of the highly dynamic part to the access optimized data structure, wherein the one or more subsequent accesses of the highly dynamic part are made by the one or more web browser components.

2. The computer program product of claim 1, further comprising, responsive to converting the highly dynamic part to an access optimized data structure, program instructions to replace the highly dynamic part with the access optimized data structure in the document object model.

3. The computer program product of claim 1, wherein program instructions to determine, based on the detected one or more read/write accesses, whether the first data structure is a highly dynamic part of the document object model further comprises:

responsive to detecting one or more read/write accesses to the first data structure of the document object model, program instructions to collect statistics of the one or more read/write accesses to the first data structure of the document object model;

program instructions to apply an optimization policy to the collected statistics, wherein the optimization policy comprises at least the first rule to define a data structure as a highly dynamic part; and program instructions to determine the collected statistics meet requirements of the at least the first rule of the optimization policy.

4. The computer program product of claim 3, wherein statistics of the one or more accesses to the first data structure of the document object model comprises at least one of access type, access quantity, access paths, or access costs.

5. The computer program product of claim 1, wherein an access optimized data structure comprises a hash table.

6. The computer program product of claim 1, wherein an access optimized data structure comprises a static list.

7. A computer system for optimizing read/write access to a document object model in a web browser, the computer system comprising:

one or more computer processors;

one or more computer readable storage media;

program instructions stored on the computer readable storage media for execution by at least one of the one or more processors, the program instructions comprising:

program instructions to detect a number of read/write accesses to a first data structure of a document object model in a web browser by one or more web browser components, wherein the document object model defines each object on a web page, one or more attributes associated with the objects, and one or more methods that can be used to manipulate the objects, and wherein the one or more web browser components include at least one of a script engine and a render engine;

program instructions to determine, based on the detected number of read/write accesses to the first data structure of the document object model and on at least a first rule that defines a data structure as a highly dynamic part, whether the first data structure is a highly dynamic part of the document object model, wherein the first rule includes determining whether the number of read/write accesses exceeds a threshold, and wherein a highly dynamic part of a document object model is a data structure that creates a bottleneck in the web browser performance due to excess processing time, wherein excess processing time is due to the highly dynamic part being accessed in excess of the threshold;

responsive to determining the first data structure is a highly dynamic part of the document object model, program instructions to trigger a conversion of the first data structure to an access optimized data structure;

program instructions to convert the first data structure to an access optimized data structure;

program instructions to detect a presence of one or more external components, wherein the one or more external components are included in the web browser, and wherein the one or more external components are unaware of the access optimized data structure;

program instructions to synchronize, the highly dynamic part and the access optimized data structure, wherein the one or more external components access the highly dynamic part of the document object model; and program instructions to reroute one or more subsequent accesses of the highly dynamic part to the access optimized data structure, wherein the one or more subsequent accesses of the highly dynamic part are made by the one or more web browser components.

8. The computer system of claim 7, further comprising, responsive to converting the highly dynamic part to an access optimized data structure, program instructions to replace the highly dynamic part with the access optimized data structure in the document object model.

9. The computer system of claim 7, wherein program instructions to determine, based on the detected one or more read/write accesses, whether the first data structure is a highly dynamic part of the document object model further comprises:

responsive to detecting one or more read/write accesses to the first data structure of the document object model, program instructions to collect statistics of the one or more read/write accesses to the first data structure of the document object model;

program instructions to apply an optimization policy to the collected statistics, wherein the optimization policy comprises at least the first rule to define a data structure as a highly dynamic part; and program instructions to determine the collected statistics meet requirements of the at least the first rule of the optimization policy.

10. The computer system of claim 9, wherein statistics of the one or more accesses to the first data structure of the document object model comprises at least one of access type, access quantity, access paths, or access costs.

11. The computer system of claim 7, wherein an access optimized data structure comprises a hash table.

* * * * *